May 16, 1939.  S. DUBERSTEIN ET AL  2,158,692
STERILIZER
Filed Aug. 21, 1935   2 Sheets-Sheet 1
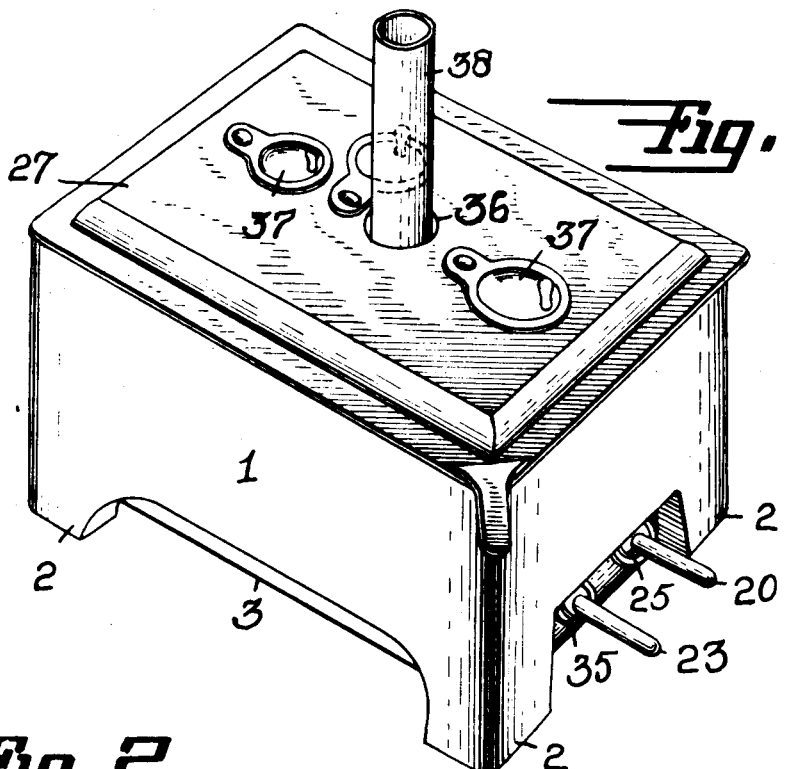
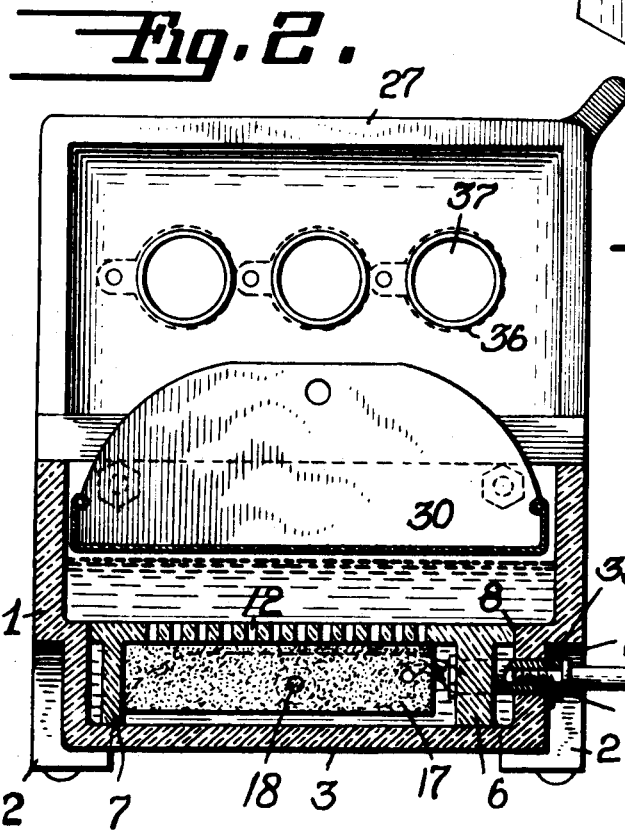
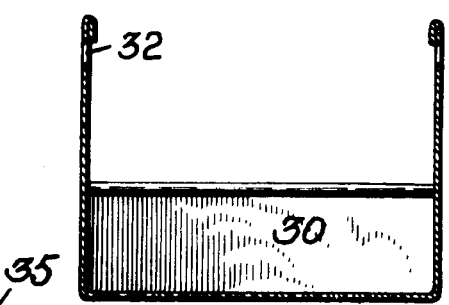
INVENTORS.
SAMUEL DUBERSTEIN &
NICHOLAS LAWNER
BY Herbert H. Thompson
THEIR ATTORNEY.

May 16, 1939.  S. DUBERSTEIN ET AL  2,158,692
STERILIZER
Filed Aug. 21, 1935  2 Sheets-Sheet 2
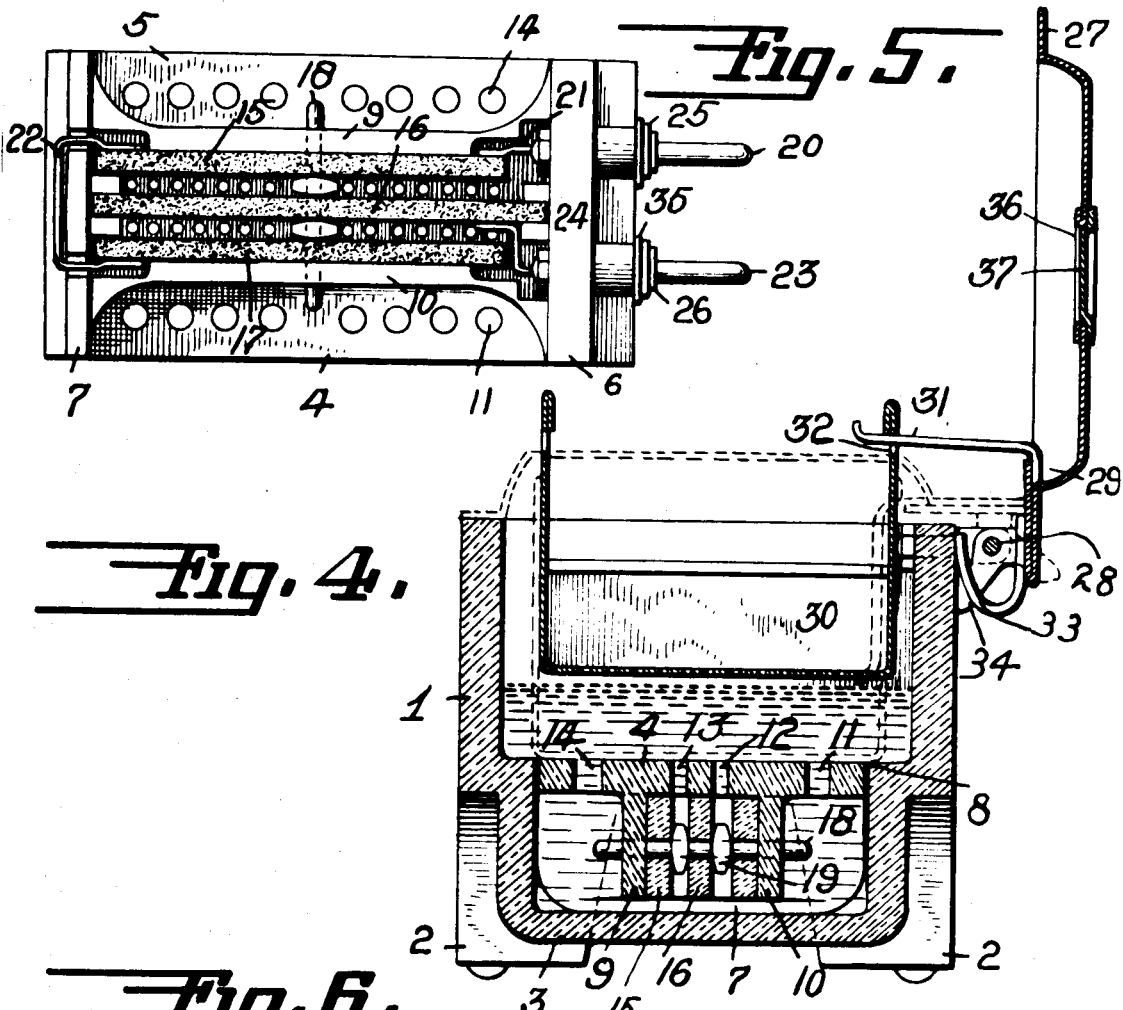
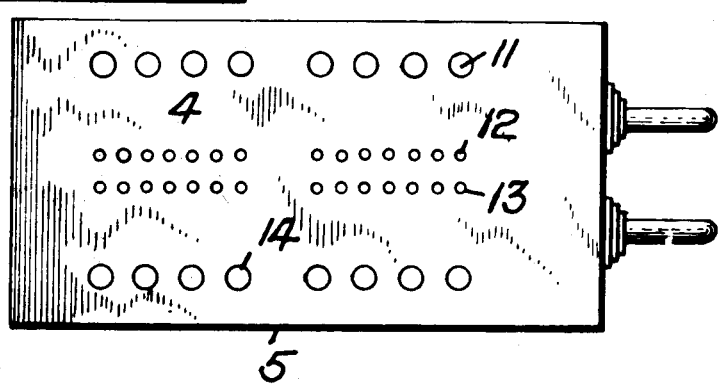
INVENTORS
SAMUEL DUBERSTEIN
NICHOLAS LAWNER
BY
Herbert H. Thompson
THEIR ATTORNEY.

Patented May 16, 1939

2,158,692

UNITED STATES PATENT OFFICE 2,158,692

STERILIZER

Samuel Duberstein and Nicholas Lawner, Brooklyn, N. Y., assignors to American Sundries Company, Inc., a corporation of New York Application August 21, 1935, Serial No. 37,183

6 Claims. (Cl. 219—40)

This invention relates especially to electrically heated sterilizers for sterilizing medical and dental instruments, although many features thereof are adapted for use in the general art of small cooking utensils, such as tea-kettles, double boilers, and the like. At present it is customary to make the sterilizing container of metal and to heat the water by a sealed resistance unit in the base. Such vessels corrode and discolor and the heating unit is many times ruined if it is allowed to boil dry.

According to our invention, we propose to make the vessel of porcelain or like refractory material and to make the heating unit also of porcelain with full access of the water to electrode elements secured therein, the water being heated by the passage of the current through it as well as by the heating of the electrodes, whereby unusually rapid and effective heating is obtained. In order that the heater may work substantially regardless of the chemical purity of the water used, we employ closely positioned parallel carbon strips as electrodes, providing ample exposed area.

Referring to the drawings disclosing a preferred form of our invention.

Fig. 1 is a perspective view of our complete sterilizer.

Fig. 2 is a vertical, longitudinal section of the same with the lid open.

Fig. 3 is a transverse section of the tray.

Fig. 4 is a vertical, transverse section of the sterilizer with the lid open.

Fig. 5 is a bottom plan view of the heater unit detached from the porcelain box.

Fig. 6 is a top plan view of the same.

The main box or container 1 is preferably made in one piece of heavy porcelain so as to be practically indestructible and readily cleaned without scouring. The box is shown as having four short legs 2 and a depressed central portion 3 forming a rectangular channel adapted to receive the heating unit 4. Said unit is likewise preferably made primarily of heavy one piece porcelain and comprises a top 5 having a plurality of rows of perforations therein 11, 12, 13 and 14, and front and back supporting legs 6 and 7. In place, top 5 forms a false bottom for the box as it is shaped to fill the rectangular depression in the box and is on a level with the shoulders 8 therein. Between said front and back legs extend two side members 9 and 10 which are positioned within the two outer rows of holes 11 and 14 in the top and which terminate short of the bottom of the box, thus providing a free path for the circulation of the water. Between the sides, we mount the electrode heating elements which preferably consist of a plurality of spaced parallel strips of carbon 15, 16 and 17, or other electric conductor, detachably secured in place by a pin 18 extending therethrough with spacer blocks 19 of insulating material therebetween. Three such strips are shown, the outer pair resting against said side members 9 and 10, with their inner faces exposed and connected to one electric terminal 20 by wires 21 and 22, and the middle strip connected to the other terminal 23 by wire 24.

It should be observed that the middle rows 12 and 13 of said perforations lie above the space between the electrodes so that the heated water may rise therethrough. Preferably the rows of perforations 12 and 13, which lie above the space between the electrodes, are quite restricted, as shown. This has the advantage that when steam starts to form between the electrodes, its escape is restricted, thereby lessening the circulation of the heated water up past the electrodes and causing a drop in the consumption of current by the increased resistance caused by the steam bubbles displacing a part of the water between the electrodes. Said terminals are of the usual two prong type adapted to receive a heater plug. Preferably they also serve as the sole means of holding the unit in place. In assembling, the terminal posts are unscrewed, the washers 35 removed and the metal sleeves 25 inserted through openings in the bottom of the box. The washers are then placed on the terminals and they are screwed up tight to bring the collars 26 thereon against the washers and clamp them against the wall of the box. The lid 27 of the box may be of metal and is hinged thereto by hinges 28. Within the box we may provide a perforated metal tray 30 for holding the instruments or other articles being sterilized. Means are also provided for lifting the tray out of the water when the lid is opened. To this end we provide a hook 31 on the bottom of the lid which extends at an angle thereto through an aperture 32 in the side of the tray (Fig. 4). In the closed position of the lid, the tray rests on the bottom and the hook lies adjacent the back of the tray (see the dotted line position in Fig. 4), but as the lid is opened the hook first slides upwardly through the hole 32 and then lifts the tray above the water where it is held as long as the lid remains open. To prevent involuntary closing of the lid by the weight of the tray, we provide spring, U-shaped members 33 on the under side of the lid, the outer ends of which frictionally engage the back of the box when the lid is open to hold it so. Lugs 34 on the lid prevent the lid from being opened more than a predetermined amount.

On its underside the lid is also provided with a channel 29 near the hinges which may be provided by folding the edge back on itself so that the hot water condensed thereon will not run down outside of the box. We thus avoid the necessity of providing a channel on top of the box. Preferably also, we provide one or more holes 36 in the lid normally closed by pivoted caps or closures 37, so that a test tube such as shown at 38 may be inserted therein for sterilizing or testing the contents. If desired, the holes may be made of different size to accommodate different size test tubes.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In combination with a sterilizing container, a heating unit of the exposed electrode type adapted to rest on the bottom of said box and having a perforated porcelain top forming a false bottom for the box, heating elements within said unit under said top having pronged electric terminals thereon adapted to project through apertures in said box for engagement by a detachable electric plug, and means on said terminals for securing said unit in place.

2. In an electric sterilizer, a perforated porcelain member adapted to form a false bottom for the sterilizer downwardly extending sides from said member and front and back pieces, said pieces being longer than said sides to support the sides above the bottom of the sterilizer, spaced generally parallel carbon strips secured between said sides, and pronged electric terminals projected through said front piece and connected to said strips, said prongs being adapted for engagement with a detachable electric plug.

3. A sterilizer comprising a porcelain box adapted to contain water, a perforated porcelain false bottom normally fixed in said box, and spaced bare electrical conductors under said false bottom for heating the water by passing current through the water, said conductors being protected from contact with the hands by said false bottom, but the perforations in said false bottom permitting limited circulation of the water up past said conductors and through said perforations to heat all the water in the box.

4. In an immersion sterilizer, the combination with the liquid container, of a heating unit of the exposed electrode type adapted to rest on the bottom portion of the container, comprising a top portion of insulating material having a plurality of spaced apertures therethrough, and forming a false bottom for the container, and a pair of spaced strip-like conductors secured under said top portion and adapted to be connected to a source of electricity to heat the water by passing current through the water between said conductors.

5. A heating unit for immersion sterilizers, as claimed in claim 4, wherein the apertures over the space between the conductors are of small diameter, thereby limiting the rate of circulation of the water and the effective area of the electrodes exposed to the water.

6. In an immersion sterilizer, the combination with the liquid container, of a heating unit of the exposed electrode type adapted to rest on the bottom portion of the container, comprising a top portion of insulating material having a plurality of spaced apertures therethrough, and forming a false bottom for the container, a pair of spaced strip-like conductors secured under said top portion and adapted to be connected to a source of electricity to heat the water by passing current through the water between said conductors, and a removable perforated metal tray for the instruments to be sterilized, said insulated top portion acting to prevent contact of said tray with said electrodes.

SAMUEL DUBERSTEIN.
NICHOLAS LAWNER.